W. A. Foster,

Locomotive.

No. 107,472.   Patented Sep. 20, 1870.

Witnesses,
James Brierly
Chas. A. Morgan

Inventor
Wm A Foster

United States Patent Office.

WILLIAM A. FOSTER, OF FITCHBURG, MASSACHUSETTS.

Letters Patent No. 107,472, dated September 20, 1870.

IMPROVEMENT IN LOCOMOTIVES.

The Schedule referred to in these Letters Patent and making part of the same.

*To all whom it may concern:*

Be it known that I, WILLIAM A. FOSTER, of Fitchburg, in the county of Worcester and Commonwealth of Massachusetts, have invented certain new and useful Improvements in Locomotives; and I do hereby declare the following to be a full, clear, and exact description of the same, reference being had to the accompanying drawing forming a part of this specification, in which—

Figure 1:
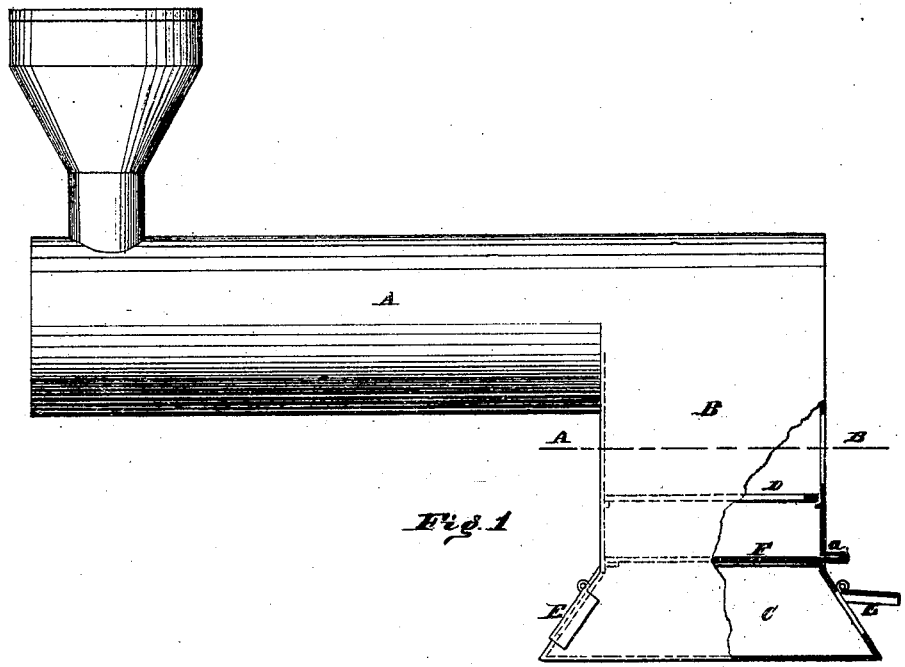
Figure 1 represents a side view of so much of a locomotive as is necessary to illustrate my invention, a portion of the fire-box being broken away to show the interior.
Figure 2:
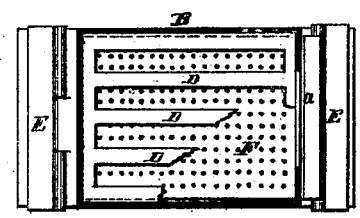
Figure 2 represents a horizontal section on line A B, fig. 1.

To enable those skilled in the art to which my invention belongs to make and use the same, I will proceed to describe it more in detail.

The nature of my invention consists in arranging below the grate a fire-screen, substantially as hereafter described.

In the drawing—

The part marked A represents the boiler of the locomotive; B, the fire-box; C, the ash-pit; D, the grate-bars; and E E, the dampers, all of which may be constructed and arranged in relation to each other in the ordinary manner, and, therefore, need not be more fully described.

In the upper part of the ash-pit C, at a short distance below the grate-bars D, I arrange a screen, F, made of fine wire-gauze, or perforated metal, so that any fire which may drop through the grate is caught and retained upon the screen F, while the air is allowed to pass through, to supply the fire, the draught being equalized and uniformly distributed to the fire-surface by the employment of the screen.

The screen F is arranged so that it can be drawn out through an opening, a, in the side of the fire-box, and any cinders or other matter collected thereon dumped into the ash-pit C.

It is well known that small coals often drop through grates, and roll out at the dampers E, which latter are open when the locomotives are in use, and, also, that frequently extensive fires are in this way kindled along the route, which burn over vast tracts of land, destroying bridges, fences, buildings, and trees, thereby endangering life, occasioning the loss of large amounts of valuable property, and creating much anxiety and suffering.

The object of my present invention is to prevent the occurrence of such disasters.

The screen F catches and retains all coals, fire, or cinders of sufficient size to do damage which may fall from the grate, thereby preventing them from being dropped along the road, while, at the same time, it equalizes the draught and properly distributes the air to the fire-grating, as before explained.

Having described my improvements in locomotives,

What I claim as new and of my invention, and desire to secure by Letters Patent, is—

The arrangement, below the fire-grate, of a fire-screen and draught-equalizer, substantially as and for the purposes set forth.

WM. A. FOSTER.

Witnesses.
   JAMES BRIERLEY,
   CHAS. A. MORGAN.